United States Patent Office.

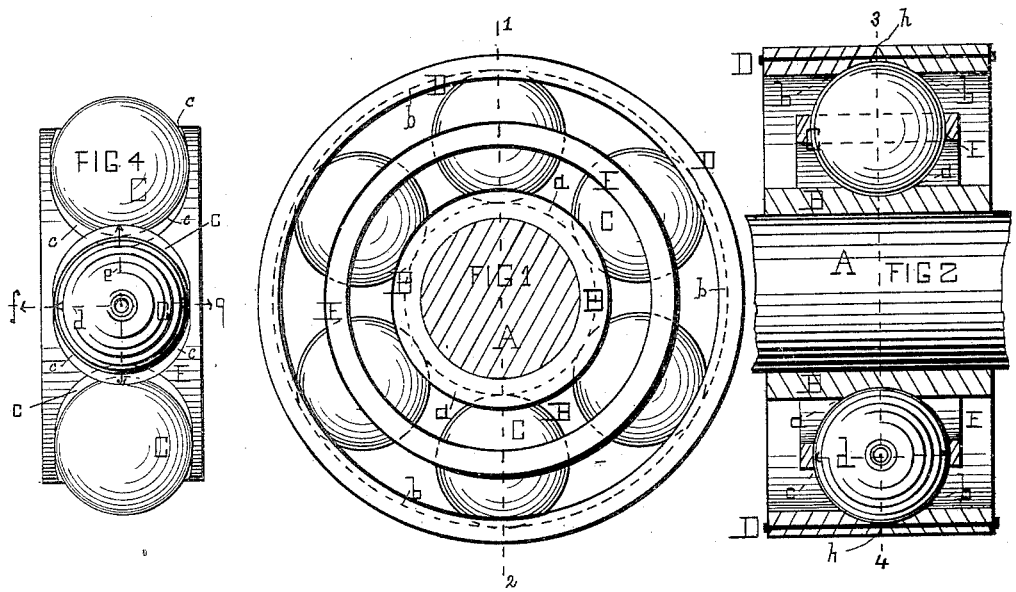

EZRA B. LAKE, OF CAMDEN, NEW JERSEY.

ANTI-FRICTION BOX.

SPECIFICATION forming part of Letters Patent No. 442,289, dated December 9, 1890.

Application filed September 23, 1889. Serial No. 324,866. (No model.)

*To all whom it may concern:*

Be it known that I, EZRA B. LAKE, a citizen of the United States, residing at Camden, in the county of Camden and State of New Jersey, have invented a new and useful Improvement in Anti-Friction Boxes for Axles, &c., of which the following is a specification.

My invention relates to a ball anti-friction box provided with a collar for spacing the balls and keeping them from closing and crowding together. Elliptical or oblong openings conveniently spaced apart are made through the collar, one for each ball. The width of the opening is about the diameter of the balls, and the length is greater than the width, so that the surface in contact of the balls with the openings is reduced to opposite or axial points in proportion to the size of the collar.

On reference to the accompanying sheet of drawings, making part of this specification, Figure 1 is an end view of a ball anti-friction box embodying my invention. Fig. 2 is a transverse and vertical section through the line 1 2, Fig. 1. Fig. 3 is a circumferential section of Fig. 1. Fig. 4 is a rim view of a spacing-collar elliptical or oblong openings and anti-friction balls; and Fig. 5 is a rim view of a spacing-collar having two rows of elliptical or oblong openings and anti-friction balls, of which any number can be used.

Similar letters refer to similar parts in the several views.

A is an axle; B, a hub fitted on the same and externally grooved at $a$ to form the inner bearing of a series of anti-friction balls C. D is a rim, which is similarly and internally grooved at $b$ and forms the top bearing of the same balls, Figs. 1, 2, and 3.

E is a spacing-collar having elliptical or oblong openings $c$ through it, in which the anti-friction balls C are placed, and thus conveniently spaced apart and kept from closing and crowding together. The width $d$ of these openings $c$ is as near the diameter of the balls C as will permit them to turn and roll freely without friction and wabbling, and the length $e$ is in excess of the diameter, so that the said balls present only two axial or diametrical points $f\,g$ of their surface for contact with the openings, which if round would create a greater rolling surface and occasion vastly-increased resistance to the motion of the anti-friction balls.

The spacing-collar should be as thin as practicable to lessen its weight on its balls, for it will be observed that by nearing axially in the openings they are enabled to carry the collar concentrically with the hub and rim without any other support. For convenience in placing the balls in the openings the rim D can be divided circumferentially in the direction of the line 3 4, Fig. 2, and the parts held together by bolts or other suitable fastenings $h$. This circumferential splitting and fastening when applied to the spacing-ring E admits of the concaving of the surface of each opening $c$ to correspond with the surface of its contained ball C, as shown by the sectional contact of the collar and ball, Fig. 2, whereby material aid is given to all the balls in carrying the spacing-collar, which, as hereinbefore stated, should be as thin as practicable. When the oblong openings $c$ are made with vertical or parallel sides, the rim D only need be split.

I claim as my invention—

1. In a roller-bearing, the combination of anti-friction balls C with a spacing-collar E, having elliptical or oblong openings $c$, in which said balls are held and spaced apart and their contact with said openings confined to axial or diametrical points, for the purpose shown and described.

2. In a roller-bearing, the combination of anti-friction balls with a spacing-collar E, having elliptical or oblong concaved openings $c$, in which said balls are held and spaced apart and their contact with said openings confined to axial or diametrical points, for the purpose shown and described.

3. The combination of a grooved hub B and rim D, anti-friction balls C, and a spacing-collar E, having elliptical or oblong openings $c$, for the purpose shown and described.

EZRA B. LAKE.

Witnesses:
FRANCIS D. PASTORIUS,
SCHUYLER C. WOODHULL.